United States Patent
Irwin (10) Patent No.: US 7,415,914 B2
(45) Date of Patent: Aug. 26, 2008

(54) TRIM PRESS ARTICLE HANDLING APPARATUS

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 0 days.

(21) Appl. No.: 10/788,849

(22) Filed: Feb. 26, 2004

(65) Prior Publication Data

US 2004/0163515 A1 Aug. 26, 2004

Related U.S. Application Data (62) Division of application No. 09/686,714, filed on Oct. 10, 2000, now Pat. No. 6,843,156.

(51) Int. Cl.
  *B26D 5/20* (2006.01)
(52) U.S. Cl. .............................. 83/365; 83/371; 83/945
(58) Field of Classification Search .................. 83/205, 83/221, 225, 226, 228, 229, 257, 259, 261, 83/267, 276, 365, 367, 370, 371, 409.1, 415, 83/416, 420, 448, 945
  See application file for complete search history.

(56) References Cited

U.S. PATENT DOCUMENTS

| | | | |
|---|---|---|---|
| 1,796,417 A | 3/1931 | Wittek | |
| 2,693,235 A | 11/1954 | Kenworthy et al. | 164/49 |
| 3,461,760 A | 8/1969 | White | 83/81 |
| 3,776,078 A | 12/1973 | Perlman | 83/210 |
| 3,782,618 A | 1/1974 | Voorhees | 226/155 |
| 3,808,927 A | 5/1974 | Neil | 83/228 |
| 3,933,069 A | 1/1976 | Tall et al. | 83/210 |
| 3,948,125 A | 4/1976 | Hujer et al. | 83/62 |
| 4,005,626 A | 2/1977 | Bateman et al. | 83/238 |
| 4,040,553 A | 8/1977 | Götz | 226/151 |
| 4,043,494 A | 8/1977 | Bickford et al. | 226/109 |
| RE29,795 E | 10/1978 | Eyberger | 83/245 |
| 4,173,161 A | 11/1979 | Arends et al. | 83/278 |
| 4,306,474 A | 12/1981 | Arends et al. | 83/50 |
| 4,380,183 A | 4/1983 | Greynolds et al. | 83/244 |
| 4,430,914 A | 2/1984 | Keim | 83/35 |
| 4,526,074 A | 7/1985 | Johnson | 83/97 |
| 4,636,348 A | 1/1987 | Whiteside | 264/544 |
| 4,687,144 A | 8/1987 | Irwin et al. | 241/49 |
| 4,792,074 A | 12/1988 | Bareis et al. | 226/149 |
| 4,844,852 A | 7/1989 | Keyser et al. | 264/153 |
| 5,122,029 A | 6/1992 | DelDuca | 414/789.2 |

(Continued)

OTHER PUBLICATIONS

U.S. Appl. No. 09/576,219, filed May 22, 2000, Irwin (pending).

*Primary Examiner*—Stephen Choi
(74) *Attorney, Agent, or Firm*—Wells St. John, P.S.

(57) ABSTRACT

An article handling apparatus for a trim press includes a die and a cooperating punch configured to sever articles from a web, a treadle configured to move relative to the die, and a drive wheel assembly configured to move the web and the articles. The drive wheel assembly includes a pair of roller feed assemblies. Each of the roller feed assemblies include a knock-lever mechanism having a lever arm and a follower wheel, the lever arm being configured to contact the die as the treadle is moved towards the die. The the follower wheel is configured to retract from the respective drive wheel in response to contact of the lever arm with the die.

13 Claims, 4 Drawing Sheets

U.S. PATENT DOCUMENTS

| | | | |
|---|---|---|---|
| 5,249,492 A | 10/1993 | Brown et al. | 83/23 |
| 5,761,978 A | 6/1998 | Nordlof | 83/259 |
| 5,773,540 A | 6/1998 | Irwin et al. | 425/387.1 |
| 5,806,745 A | 9/1998 | Irwin | 226/74 |
| 5,836,527 A | 11/1998 | Irwin et al. | 241/49 |
| 5,860,607 A | 1/1999 | Irwin | 241/80 |
| 5,893,523 A | 4/1999 | Irwin | 241/60 |
| 6,067,886 A | 5/2000 | Irwin | 83/615 |
| 6,084,375 A * | 7/2000 | Irwin et al. | 318/569 |
| 6,435,067 B1 | 8/2002 | Irwin | 83/228 |

* cited by examiner

FIG. 4

TRIM PRESS ARTICLE HANDLING APPARATUS

RELATED PATENT DATA

This patent application is a divisional application of U.S. patent application Ser. No. 09/686,714, filed Oct. 10, 2000, initially entitled "Apparatus and Method for Conveying, Guiding, and Locating a Thermoformable Web" and later amended to "Apparatus for Conveying, Guiding, and Locating a Thermoformable Web", naming Jere F. Irwin as inventor, and which is now U.S. Pat. No. 6,843,156, the disclosure of which is incorporated by reference.

TECHNICAL FIELD

The present invention pertains to an apparatus and method for handling a thermoformed sheet or web of plastic or foam material containing thermoformed thin-walled articles when separating the articles from the web. More particularly, this invention relates to a trim press article handling apparatus such as a conveyor having a treadle in the form of a web and article conveying, guiding, and locating device.

BACKGROUND OF THE INVENTION

Various devices are known for trimming thin-walled articles from sheets of thermoformed plastic material. The trimming or severing of such articles from a continuous sheet of thermoformable plastic and/or foam material has long been known in the art. Additionally, sheet guides and mechanical treadles are known for moving the sheet and articles for intermittent severing between coacting punches and dies of a trim press.

U.S. Pat. No. 4,173,161 discloses a mechanical trim press that includes a mechanical treadle having feed fingers mounted on the treadle. The feed fingers comprise a mechanical linkage that interacts with projecting integral tabs formed in the sheet to advance the sheet to a die in step-bystep movement that is mechanically synchronized with the stroke of the punch. The treadle also includes opposed pairs of vertical guide strips between each article. Each guide strip is carried by a spacer that is mounted onto a cross frame member of the treadle. Opposed pairs of guide strips, provided between each adjacent pair of formed articles in the sheet, are spaced apart slightly from each other by a distance slightly greater than the thickness of the sheet passing therebetween. However, such close spacing coupled with the use of guide strips between every adjacent pair of articles results in increased frictional forces which tends to result in mis-feeding and jamming of the treadle, particularly when running the treadle at relatively high product feed rates.

SUMMARY OF THE INVENTION

A trim press article handling apparatus is described. A treadle device is provided for conveying, guiding, and locating web-supported articles or products during a web processing operation. More particularly, a treadle assembly guides web-supported articles into a trim press prior to and while severing the articles from the web. Such treadle device provides accurate location of articles while moving the web and reducing frictional forces generated between the treadle and web which would otherwise result in an increased occurrence of mis-feeds and misalignment of the web and articles, particularly during relatively high speed trim operations. An additional degree of accuracy is also provided during such severing operation over that previously provided via use of accurate high speed conveying, guiding, and locating techniques. Additionally, feedback controlled operation is maintained to drive a servo pick and servo helper of a web feed delivery device associated with the treadle and trim press.

According to one aspect, a trim press article handling apparatus includes a frame, a punch carried by the frame, a die carried by the frame and cooperating in relative movement with the punch to sever articles from a web. The apparatus also includes a treadle carried for movement relative to the die, the treadle including a web guide member, a primary guide strip spaced from the guide member slightly greater than a thickness of the web, a secondary guide strip spaced from the guide member at least four thicknesses of the web and spaced apart from the primary guide strip, and an article detector carried by at least one of the primary guide strip and the secondary guide strip and operative to detect position of an article in the web by detecting the position of a protuberance in the web as the protuberance is conveyed between the primary guide strip and the secondary guide strip. The apparatus further includes a control circuitry communicating with the article detector and a drive motor operative to move the treadle, the control circuitry configured to receive an input signal from the article detector indicative of the position of a web-supported article relative to the punch and the die, and operative to control operation of the drive motor to synchronize movement of the web-supported article via controlled motion of the treadle. A drive wheel assembly is provided for moving a web and articles, the drive wheel assembly including a pair of roller feed assemblies provided on opposed edges of a web, wherein each of the roller feed assemblies comprises a knock lever mechanism having a lever arm and a follower wheel, the knock lever mechanism carried by the treadle. The lever arm is configured to contact the die as the treadle is moved towards a stationary platen carrying the die, and the follower wheel is configured to retract from the respective drive wheel in response to contact of the lever arm with the die.

According to another aspect, a trim press article handling apparatus includes a frame, a punch carried by the frame, a die carried by the frame and cooperating in relative movement with the punch to sever articles from a web. The apparatus also includes a treadle configured to move relative to the die, a drive wheel assembly for moving the web and the articles, the drive wheel assembly comprising a pair of roller feed assemblies provided on opposed edges of the web. Each of the roller feed assemblies includes a knock lever mechanism having a lever arm and a follower wheel, the knock lever mechanism carried by the treadle, the lever arm configured to contact the die as the treadle is moved towards a stationary platen carrying the die, and the follower wheel configured to retract from the respective drive wheel in response to contact of the lever arm with the die.

According to a further aspect, an article handling apparatus for a trim press includes a die and a cooperating punch configured to sever articles from a web, a treadle configured to move relative to the die, and a drive wheel assembly configured to move the web and the articles. The drive wheel assembly includes a pair of roller feed assemblies. Each of the roller feed assemblies include a knock-lever mechanism having a lever arm and a follower wheel, the lever arm being configured to contact the die as the treadle is moved towards the die. The the follower wheel is configured to retract from the respective drive wheel in response to contact of the lever arm with the die.

According to yet another aspect, a trim press article handling apparatus includes a punch and a die carried by a frame, the die cooperating with the punch to sever articles from a web of thermoformable material, a treadle configured to move relative to the die, the treadle including a web guide member, a primary guide strip disposed adjacent the web guide member, a secondary guide strip spaced from the guide member, and an article detector to detect a position of an article in the web, a control circuitry communicating with the article detector, and a drive wheel assembly for moving a web and articles, the drive wheel assembly comprising a pair of roller feed assemblies, each of the roller feed assemblies includes a knock lever mechanism having a lever arm and a follower wheel, wherein a gap is formed between the follower wheel and the respective drive wheel in response to contact of the lever arm with the die to release the web carried therebetween to enable lateral centering of the articles carried in the web.

BRIEF DESCRIPTION OF THE DRAWINGS

Preferred embodiments of the invention are described below with reference to the following accompanying drawings.

FIG. 3 is a simplified sectional view taken generally along line 3-3 of FIG. 2 but including the trim press punch plate and die plate of FIG. 1 and further showing the control system and servo pick conveyor.

DETAILED DESCRIPTION OF THE PREFERRED EMBODIMENTS

This disclosure of the invention is submitted in furtherance of the constitutional purposes of the U.S. patent Laws "to promote the progress of science and useful arts" (Article 1, Section 8).

Reference will now be made to a preferred embodiment of Applicant's invention. One exemplary implementation is described below and depicted with reference to the drawings comprising an article conveying, guiding, and locating device and method for aligning articles within a web of thermoformable material for a severing operation. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
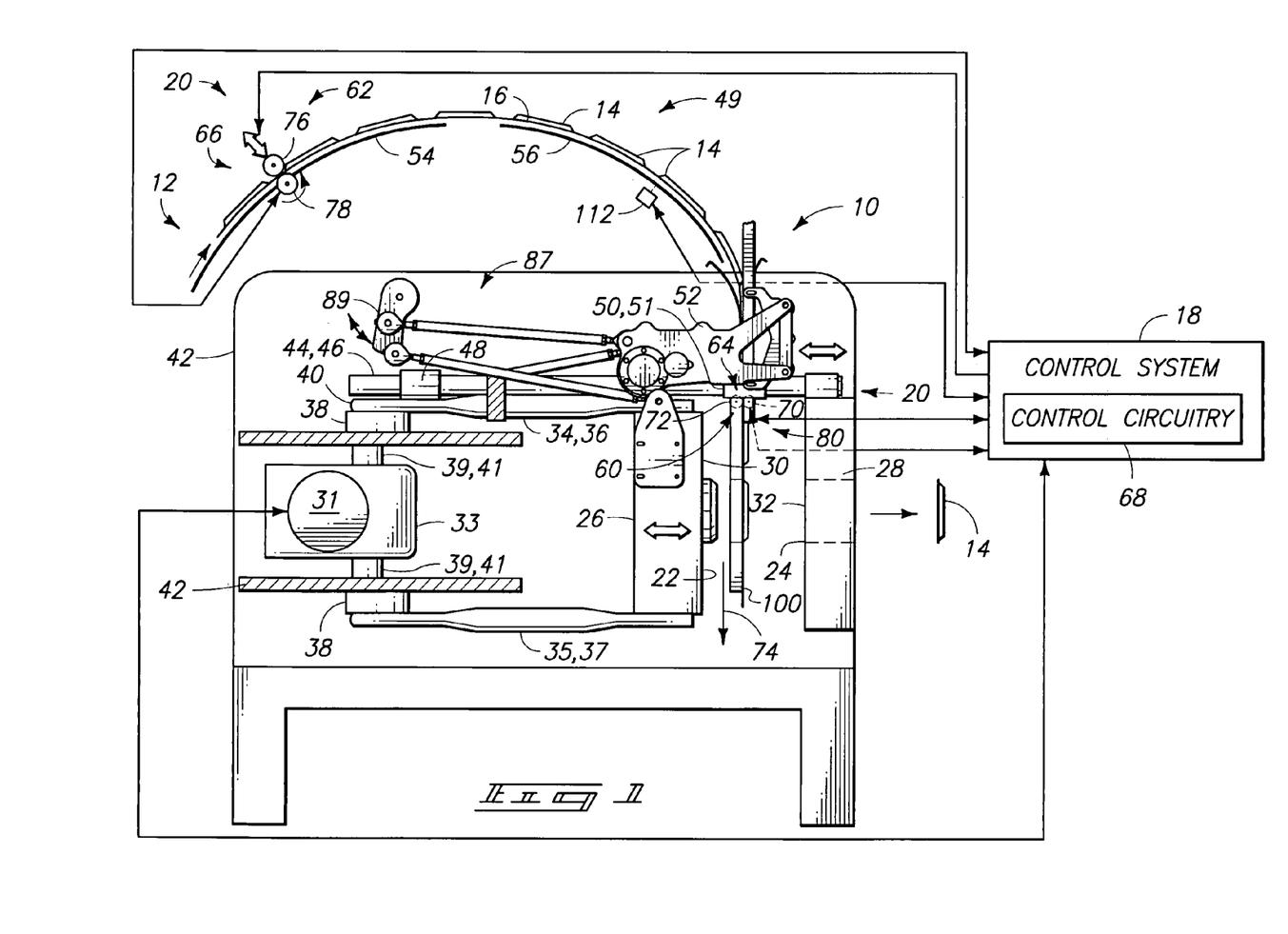
FIG. 1 is a vertical side view of a thermoforming machine trim press having a treadle conveying, guiding, and locating device embodying one aspect of the invention.

A preferred embodiment of Applicant's invention is shown on a thermoforming machine trim press having a treadle system that is generally designated with reference numeral 10 in FIG. 1. More particularly, treadle system 10 is provided on a trim press 12 to accurately convey, guide, and locate articles 14 formed within a sheet, or web, 16 of thermoformable material during an article trim operation that severs articles 14 from web 16. Treadle system 10 is operative to intermittently convey and align articles 14 so as to successively sever rows of such articles 14 from the web 16.

A control system 18 of treadle system 10 choreographs operation of trim press 10 acting in unison with a servo motor driven conveyor 20 that includes a servo pick assembly 60 and a servo helper assembly 62. Conveyor 20 moves web 16 in which individual articles, or products, 14 have previously been formed using a thermoforming machine (not shown). In operation, web 14 is driven in intermittent motion using control system 18 and conveyor 20 to successively feed individual rows of articles 14 into trim press 12 where the articles 14 are severed from web 16. During closure of trim press 12, treadle 10 aids in accurately positioning articles 14 with respect to punch and die members 22 and 24 just prior to severing articles 14 from web 16.

Further details of one exemplary trim press similar to trim press 12, but configured in a vertical orientation are disclosed in Applicant's copending U.S. patent application Ser. No. 09/576,219, entitled "Article Stacking Device, Trim Press Article Accumulator, and Method of Stacking Thermoformed Articles", naming Jere F. Irwin as inventor. Such U.S. patent application Ser. No. 09/576,219 is herein incorporated by reference. Trim press 12, as depicted herein, is a modified version of Applicant's commercially available trim press "Model 28NT Trim Press", sold by Irwin Research and Development, of Yakima, Wash. The modifications entail adding the novel control system 18, conveyor assembly 20, and treadle system 10.

In order to improve the speed and accuracy with which articles 14 are severed from web 16 by trim press 12, treadle 10 is provided on trim press 12 incorporating desired features of Applicant's invention. Treadle 10 provides highly accurate article conveying, guiding, and locating when delivering web-supported articles between punches 22 and dies 24 of trim press 12.

Trim press 12 includes a movable platen 26, a stationary platen 28, a punch plate 30, and a die plate 32. Punch plate 30 is carried for movement by movable platen 26, whereas die plate 32 is fixedly carried by stationary platen 28. However, it is understood that platen 28 and die plate 32 can also be movably supported for operation according to an alternative construction.

As shown in FIG. 1, movable platen 26 is carried for horizontal reciprocation by crank arm assemblies 34-37. Details of one exemplary thermoforming machine suitable for incorporating treadle 10 and having such crank arm assemblies are shown in U.S. patent application Ser. No. 08/691,856, now U.S. Pat. No. 6,067,886, entitled "Machine Trim Press Having Counterbalance Features", and naming the inventor as Jere F. Irwin. Such U.S. Pat. No. 6,067,886 is herein incorporated by reference.

An electric servo motor 31 drives crank arm assemblies 34-37 via a transfer case assembly 33 including a pair of connected transfer cases and a respective pair of rotating drive shafts 39, 41 similar to those disclosed in U.S. Pat. No. 6,067,886, previously incorporated by reference.

Each crank arm assembly 34-37 comprises a throw arm 38 and a platen connecting rod 40, wherein arm 38 and rod 40 cooperate to form a kinematic linkage that drives a dedicated corner of platen 26 for horizontal, guided reciprocation. Additionally, two cylindrical, stationary guide posts (not shown) are rigidly carried by a frame 42 to support platen 26 for movement in an axial, horizontal direction. Optionally, four guide posts can be configured to support platen 26 with two corresponding bronze bushings. The use of platen guide posts is understood in the art. Accordingly, such guide posts have been omitted from the figures in order to simplify the drawing and to prevent obscuring the invention at hand.

Additionally, a pair of stationary, cylindrical guide posts 44, 46 are rigidly supported by frame 42 to guide horizontal, reciprocating movement of treadle 10 relative to frame 42 and stationary platen 28. Bronze bushings 48 and 50-51 on treadle 10 are affixed to a frame 52 of treadle 10, and are configured to slide along guide posts 44, 46, respectively.

Stationary guide members 54 and 56, in the form of pairs of edge guide tracks and central guide tracks, form a self-feeding canopy 49 that guides web 16 and articles 14. More particularly, guide members 54 and 56 guide and move web 16 and articles 14 from a thermoforming machine (not shown), positioned upstream of trim press 12, downwardly into treadle 10 and between punch plate 30 and die plate 32 for severing articles 14 from web 16 therebetween.

Web conveyor assembly 20 moves web 16 and articles 14 along guide members 54 and 56 and through treadle 10. Web conveyor 20 comprises a servo pick assembly 60 and a servo helper assembly 62. Servo pick assembly 60 is carried by treadle 10, whereas servo helper assembly 62 is carried by guide member 54. Accordingly, servo pick assembly 60 is carried for movement relative to stationary servo helper assembly 62.

As shown in FIG. 1, web conveyor assembly 20 is illustrated in simplified form. More particularly, servo pick assembly 60 and servo helper assembly 62 are each depicted as a drive wheel assembly 64, 66, wherein each includes a servo motor (not shown) that is controllably actuated via a control system 18 to impart intermittent motion that feeds web 16 into trim press 12.

Servo pick assembly 60 and servo helper assembly 62, according to one construction, each include a Siemens servo motor Model Part No. 1 FT5062-1 AC71-4FAO, commercially available in the United States from Siemens Energy & Automation, of Atlanta, Ga. Additionally, the servo motors for servo pick assembly 60 and servo helper assembly 62 each further includes a rotary encoder which is used in conjunction with the servo motor as a feedback signal to detect motion of drive wheels 72 and 78 in order to directly measure the amount of feed imparted by servo helper assembly 62 relative to the feed of servo pick assembly 60. Accordingly, the servo helper assembly is synchronized in relation to the speed of the servo pick assembly.

According to prior art techniques, a servo pick assembly was utilized with a helper assembly having a variable speed motor. The variable speed motor was regulated so as to deliver a distance of web at least as much as that which is moved by the servo pick assembly. An accumulation region was provided along guide member 54 to accumulate any excess web which is overfed by the helper assembly, wherein the helper assembly is driven by the variable speed motor which is run at a speed that delivers a web equal to or greater in quantity than that delivered by the servo pick assembly. Hence, the accumulation of web and articles occurs along the guide member. However, the buildup of excess sheet there along has a tendency to bounce the sheet and articles around, which can cause misalignment problems and cause a reduction in the maximum operating speed for the conveyor. Accordingly, synchronization of a servo helper assembly with a servo pick assembly leads to increased product throughput rates. Such result is realized because the motor on the servo helper assembly can duplicate a nearly identical motion as the motor on the servo pick assembly since both motors comprise servo motors.

Additionally, a photo proximity switch 112 is carried by guide member 56, beneath one edge of web 16 for detecting the proximity of web 16 in relation to guide member 56. More particularly, switch 112 comprises a Model No. E51-Q25FN6FF100Q sensor, otherwise referred to as an EasyEasy-Beam Q25 Series sensor, sold commercially by Banner Engineering Corporation of Minneapolis, Minn. Such a photo proximity switch has a focal range that monitors the proximity of web 16. When the web is within a focal point range of approximately four inches, a digital output is generated. When the focal point exceeds the approximately four-inch range, a different digital value is generated and delivered to control system 18. Accordingly, control system 18 monitors the proximity of web 16 relative to guide member 56 of canopy 49. When a significant amount of detected separation occurs between web 16 and guide member 56, control system 18 reduces the operating speed of drive wheels 78 for servo helper assembly 62. Accordingly, the delivery speed of servo helper assembly 62 relative to servo pick assembly 60 is controllably regulated by control system 18 in response to the signal detected by photo proximity switch 112. Alternatively, it is understood that any of a number of other proximity switches can be utilized, such as proximity mode ultrasonic sensors, or optical detectors.

By controllably regulating the operating speed of drive wheels 78 relative to drive wheels 72, the accumulation of web 16 therebetween is substantially prevented.

Accordingly, the need for a substantial accumulation area along guide member 54 is eliminated. Furthermore, motion of the web and articles is monitored at treadle 10 via article detector 80 and control system 18. For cases where servo helper assembly 62 does not exactly mimic the delivery rate for the servo pick assembly 60 or when misalignment is detected or likely to occur, control system 18 briefly and quickly opens or raises follower wheel 76 away from drive wheel 78 using a pneumatic cylinder which raises each follower wheel 76 along opposite edges of web 16. Hence, opening of follower wheels 76 for a very short period of time while trim press 12 is open enables realignment of the web and adjustment and spacing of the web between drive wheel assembly 64 and drive wheel assembly 66. For example, such opening in one case lasts 0.07 seconds. Such brief opening, actuated via pneumatic cylinders and control system 18, achieves minor corrections in the length and alignment of web positioned between drive wheel assemblies 64 and 66 which accounts for any minor variations in the amount of web delivered by servo pick assembly 60 and servo helper assembly 62. Accordingly, such correction is only implemented in response to monitoring of web and article delivery utilizing article detector 80 and/or switch 112. Alternatively, such correction can be implemented periodically, such as after every five trim press cycles.

According to one construction, optical beam 108 (see FIG. 3) detects locations of articles 14 by detecting the positioning of an article that interrupts beam 108. Alternatively, web 16 can include protuberances specifically designed to interrupt optical beam 108 and thermoformed into web 16 at a location known relative to articles 14. Accordingly, optical beam 108 can be utilized to detect such protuberances in order to locate the positioning of articles 14 relative to plate 100. Accordingly, articles 14 form one of a number of different types of protuberances within web 16 which are detected via optical (or light) beam 108.

As shown in FIG. 1, drive wheel assembly 64 comprises two pairs of co-acting wheels that are provided along opposite side edges of web 16. An outermost wheel of each pair comprises a follower wheel 70 and an innermost wheel of each pair comprises a drive wheel 72. The pair of drive wheels 72 are driven by a common servo motor using a splined shaft (not shown) that extends between the drive wheels and drives each wheel using a splined drive wheel attached to each drive wheel 72 that attaches to the splined shaft via a correspondingly splined drive belt. Accordingly, each drive wheel 72 is actuated and driven by a common servo motor.

Accordingly, actuation of drive wheel assembly 64 via controller 68 is operative to intermittently deliver rows of articles 14 into trim press 12. Such rows of articles 14 are then severed as control circuitry 68 of central system 18 actuates a severing operation via trim press 12. Subsequently, a scrap web 74 is delivered from trim press 12 and ground into small pieces using a comminuting device (not shown) configured for grinding up scrap web 74 and positioned beneath trim press 12.

Similarly, drive wheel assembly 66 comprises two pairs of co-acting top and bottom wheels that are provided along opposite side edges of web 16. A topmost wheel of each pair comprises a follower wheel 76 and a bottom-most wheel of each pair comprises a drive wheel 78 that is actuated and driven by a servo motor. As was the case with driver assembly 64, drive wheels 78 of drive wheel assembly 66 are driven using a common servo motor, a splined drive shaft, splined drive wheels, and a pair of correspondingly splined drive rollers attached to each drive wheel 78. Accordingly, actuation of drive wheel assembly 66 via controller 18 is operative to intermittently deliver rows of articles 14 into trim press 12 in cooperation with drive wheel assembly 64.

As shown in FIG. 1, drive wheel assembly 64 comprises a dual servo motor driven roller feed assembly referred to herein as servo pick assembly 60. According to one construction, follower wheels 70 and 76 are each formed from a high density polyethylene (HDPE) plastic material. Also according to one construction, drive wheels 72 and 78 are each formed from an anodized aluminum material having a knurled radial outer surface that coacts with web 16.

Additionally, web 16 is delivered through an oven and a thermoforming machine using a web conveyor, upstream of trim press 12. One exemplary detailed construction for a web conveyor is disclosed in U.S. Pat. No. 5,806,745, herein incorporated by reference.

According to one construction, article registration is carried out by adjusting the operation of conveyor 20 using controller 18 in order to adjust the advancement and positioning of individual articles between punch plate 30 and die plate 32.

However, in some cases, it is very difficult to adjust the set-up and component positioning for a web conveyor in order to accurately and precisely deliver articles 14 between punch plate 30 and die plate 32. Hence, article registration implemented solely using conveyor set-up and control does not always sever such articles in a sufficiently uniform and accurate manner. Furthermore, there are limitations to the accuracy with which a servo motor can drive conveyor assembly 20, and therefore, in the ability of such servo motors to accurately place articles 14 between punch plate 30 and die plate 32. Oftentimes, it is the case that articles 14 are off by several millimeters, which can produce an undesirable effect, particularly where article 14 is of a complicated shape, or article 14 comprises a foldable container having a hinge which requires a high degree of accuracy in forming and severing thereof in order to accurately place the hinge.

Accordingly, an article registration device (not shown) can alternatively be added to punch plate 30 and die plate 32 in order to provide an enhanced ability to accurately register articles 14 between punch plate 30 and die plate 32 when severing such articles 14 from web 16. One suitable article registration device is disclosed in Applicant's pending U.S. patent application Ser. No. 09/575,783, now U.S. Pat. No. 6,435,067B1, entitled "Apparatus and Method for Registering Articles During a Web Processing Operation", naming the inventor as Jere F. Irwin, and herein incorporated by reference.

After severing articles 14 from web 16, the scrap web is delivered into a comminuting apparatus (not shown) that is provided directly beneath punch plate 30 and die plate 32. Several different comminuting apparatus suitable for grinding up the resulting scrap web are disclosed in U.S. Pat. Nos. 4,687,144; 5,836,527; 5,860,607; and 5,893,523, each herein incorporated by reference. Scrap web 74 is accordingly forwarded into such a recycling, pulverizing machine where the scrap web is shredded and then later recycled to form a new web of thermoformable plastic material.

Details of one exemplary thermoforming machine suitable for forming articles 14 within web 16 are disclosed in U.S. Pat. No. 5,773,540. U.S. Pat. No. 5,773,540 is herein incorporated by reference.

Control system 18 of FIG. 1 comprises a controller having control circuitry 68 such as processing circuitry and memory. According to one construction, processing circuitry is provided by a central processing unit (CPU). According to another construction, processing circuitry is provided by a microcontroller which cooperates to form the controller. It is understood that memory is operative to store software subroutines that are retrieved and implemented on the processing circuitry in order to impart motion control functionality by way of controller 18 to trim press 12 and conveyor 20.

As shown in FIG. 1, control system 18 is operative to generate control signals that direct operation of servo drive motor 31 that drives crank arm assemblies 34-37 and thereby imparts reciprocation to movable platen 26. Servo drive motor 31 comprises a highly accurate computerized servo motor and servo drive which can be accurately driven by control system 18. In operation, servo drive motor 31 drives a gear box or transfer case 33 that imparts a rotary motion to each of crank arm assemblies 34-37. Furthermore, control system 18 is operative to deliver a control signal to the servo drive motors of servo pick assembly 60 and servo helper assembly 62 that advances article conveyor 20. Additionally, control system 18 receives an input signal from an article detector 80 provided on treadle 10 for detecting the location of articles being moved by treadle 10 into trim press 12.

As shown in FIGS. 1 and 3, treadle 10 is driven via a kinematic linkage 87 by movable platen 26, wherein movable platen 26 is driven via motor 31. Accordingly, kinematic linkage 87 causes frame 52 of treadle 10 to reciprocate back and forth in relation to the movement of movable platen 26, relative to stationary platen 28. Kinematic linkage 87 includes a rocker arm 89 which has a fixed rotatable pivot attached to frame 42.

Figure 2:
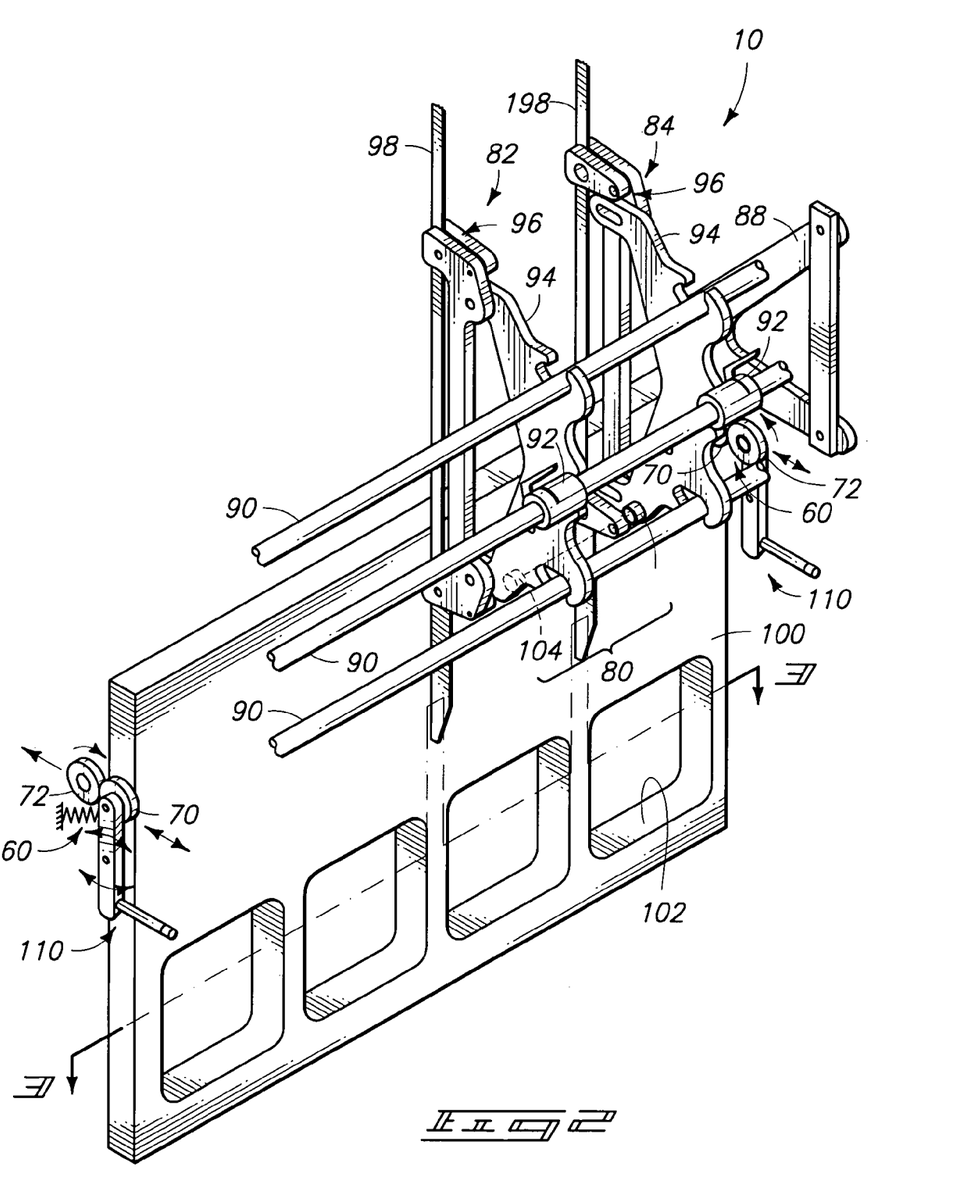
FIG. 2 is a simplified partial perspective view of the treadle of FIG. 1 and illustrates an article sensing device provided by the treadle.

As shown in FIG. 2, a partial view of the treadle illustrates important components relating to Applicant's invention; namely, the frame of treadle 10 includes a pair of side plates 88 (only one illustrated herein) which are joined together by three the rods 90. A primary guide member 82 is provided in proximate association with web guide plate, or web guide member, 100. A secondary guide member 84 is spaced substantially further apart from plate 100 than is primary guide member 82. Secondary guide member 84 is provided principally to serve as a gross alignment structure which is received between adjacent rows of articles so as to grossly induce alignment of articles with web guide plate 100 relative to article apertures 102.

Primary guide member 82 and secondary guide member 84 each include an attachment plate 94 having a quick release adjustment collar 92 which includes a threaded, rotatable lock arm that enables clamping and unclamping of adjustment collar 92 along a central one of tie rods 90. In this manner, primary guide member 82 and secondary guide member 84 can be quickly and easily laterally adjusted in position relative to web guide plate 100 so as to accommodate changes to different die configurations.

Primary guide member 82 further comprises a clamp bar 96 affixed with fasteners to attachment plate 94, and further affixed to support a guide strip 98 that is nested in proximate relation relative to a surface of guide plate 100. According to one construction, a gap exists between guide strip 98 and web guide plate 100 somewhere in the range of 1-3.5 thicknesses of a web of material which is to be received and processed therebetween.

Secondary guide member 84 further comprises a clamp bar 96 carried by attachment plate 94 and further supporting a guide strip 198. Guide strip 198 is constructed so as to provide a substantially greater amount of clearance between guide strip 198 and web guide plate 100 than is provided between guide strip 98 and web guide plate 100. Accordingly, guide strip 198 is spaced apart from plate 100 at least 3.5 thicknesses of a web which is to be received and processed therethrough. Preferably, web guide plate 100 is provided within a range of 3.5 to 10 thicknesses (or more) of a web of material. In this manner, delivery of a web and articles there along is principally guided by guide strip 98, and little or no contact occurs between guide strip 198 and such web during a processing operation.

Additionally, as shown in FIG. 2, article detector 80 comprises an optical emitter 104 carried by attachment plate 94 of primary guide member 82 and a detector 106 carried by attachment plate 94 of secondary guide member 84. A light beam 108 is generated from emitter 104 and received at detector 106. The presentment of an article between primary guide member 82 and secondary guide member 84 causes interruption of light beam 108 which is detected at the control system 18 (of FIG. 1). Accordingly, the positioning of articles can be readily determined utilizing the control system and article detector 80 pursuant to Applicant's invention.

As additionally illustrated in FIG. 2, servo pick assembly 60 comprises a pair of drive wheels 72 and follower wheels 70 along opposite edges of a web of material which is processed therebetween. Follower wheels 70 are retracted with each utilizing a knock lever mechanism 110 as treadle 10 is moved towards stationary platen 24 (of FIG. 1). Accordingly, drive wheels 72 and follower wheels 70 are separated just prior to severing of an article so that further alignment can occur via coaction of the die surface and/or an alignment structure which further laterally positions articles relative to associated punches and dies of the trim press.

As shown in FIG. 2, knock mechanism 110 comprises a kinematic linkage having a center pivot point and a lever arm at one end that contacts stationary platen 28 as treadle 10 is moved there against during a severing operation. The other end of mechanism 110 carries follower wheel 70. Such contact rotates follower wheel 70 away from drive wheel 72 so as to open up a gap therebetween, thereby releasing respective edges of the web to ensure further centering. Further centering relies on contour features of the individual punches 22 coacting in combination with the shape of in-molded articles in the web to laterally further align such articles relative to each respective punch and die, according to one construction.

FIG. 3 illustrates in simplified form the arrangement of punch plate 30, web guide plate 100 (configured here as a stripper plate), and die plate 32. Controller 18 includes control circuitry 68 which is operative to control the servo motors which activate drive wheels 72. Follower wheels 70 are retractable in response to actuation of knock mechanism 110, illustrated in FIG. 2.

As shown in FIG. 3, guide strip 98 serves principally to guide web 16 and articles 14 against plate 100. In contrast, guide strip 198 is spaced a significant distance away from plate 100, and principally serves to support detector 106. However, guide strip 198 also serves to grossly retain web 16 into position along plate 100 in the event that web 16 becomes suddenly significantly misaligned. Accordingly, under normal operating conditions, guide strip 98 serves as the only principal guide for retaining web 16 in close proximity against web guide plate 100. Accordingly, frictional forces therebetween are significantly reduced. Furthermore, emitter 104 and detector 106 further serve to detect the location and positioning of articles 14 as they are delivered via drive wheel 72 (and associated servo motor). All such control is choreographed utilizing controller 18 as well as a feedback signal from detector 106.

As shown in FIG. 3, punch plate 30 includes a plurality of punches 22, each supported on axially guided springs. The springs facilitate interdigitation and lateral alignment with appropriately configured articles 14, and compress and coact with punch plate 30 during final severing against die plate 32 through the holes within plate 100.

As shown in FIG. 3, follower wheels 70 are caused to open (or retract) away from drive wheel 72 via action of knock lever mechanisms 110 (see FIG. 2). Such retraction further facilitates lateral alignment of web 16 and articles 14 relative to punches 22 and dies within die plate 32.

Also illustrated in FIG. 3, guide strip 98 is shown in close proximity with web guide plate, or web guide member, 100. In contrast, guide strip 198 is shown spaced relatively far apart from plate 100.

Figure 4:
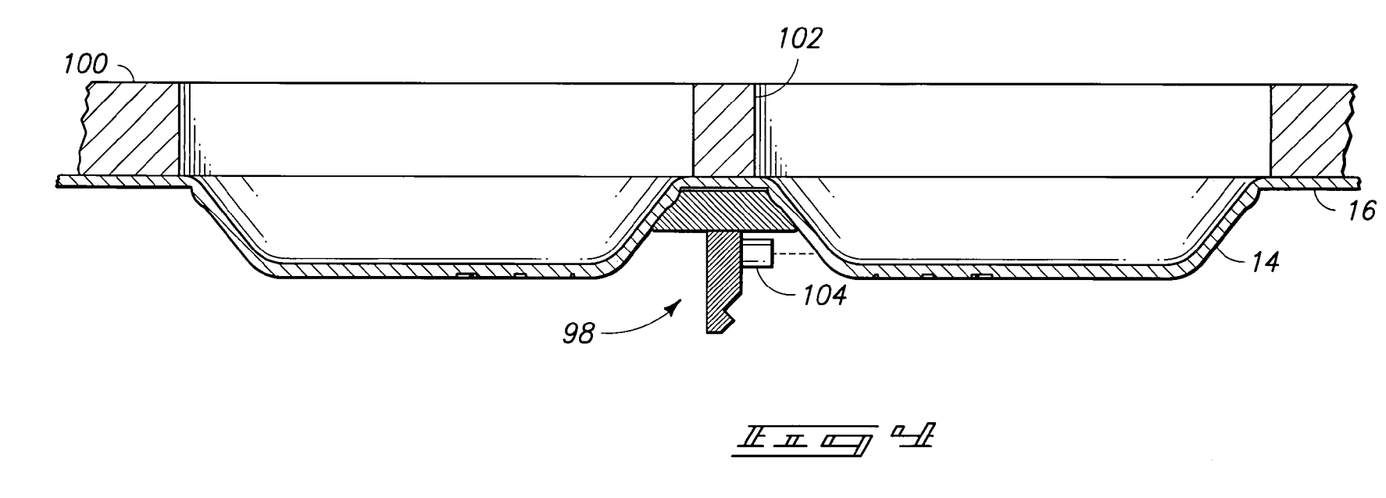
FIG. 4 is an enlarged, simplified sectional view of the primary guide member and web guide plate taken generally along line 3-3 of FIG. 2 and including a web containing articles.
Figure 5:
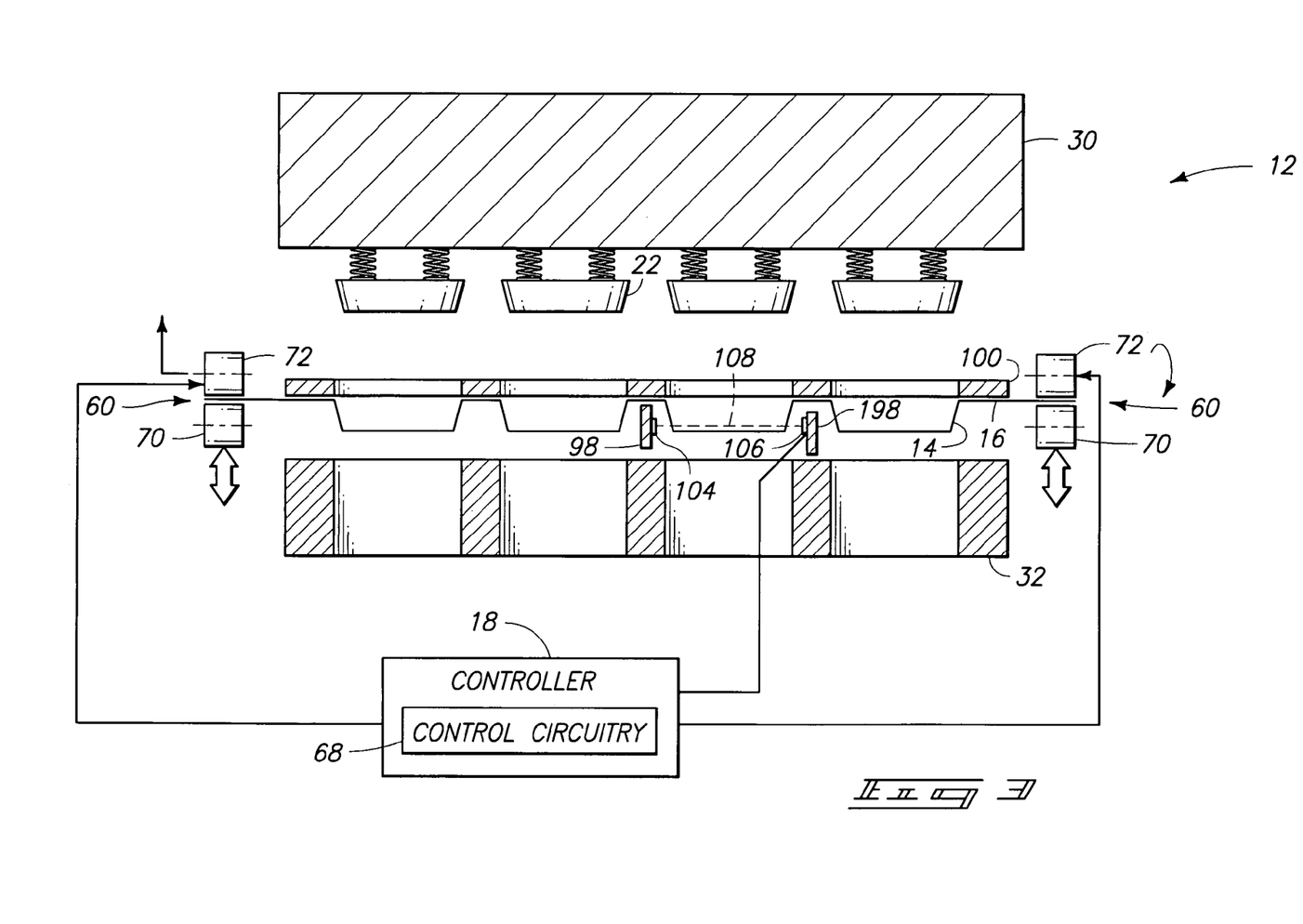

FIG. 4 illustrates an enlarged partial view corresponding with line 3-3 of FIG. 2, the relative positioning of guide strip 98 of primary guide member 82 (see FIG. 2) relative to web guide plate 100. Guide strip 98 is provided in relatively close proximity with plate 100 so as to ensure alignment and positioning of web 16 (and articles 14) relative to articles apertures 102 in plate 100.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A trim press article handling apparatus, comprising:
a frame;
a punch carried by the frame;
a die carried by the frame and cooperating in relative movement with the punch to sever articles from a web;
a treadle carried for movement relative to the die, the treadle including a web guide member, a primary guide strip spaced from the guide member slightly greater than a thickness of the web, a secondary guide strip spaced from the guide member at least four thicknesses of the web and spaced apart from the primary guide strip, and an article detector carried by at least one of the primary guide strip and the secondary guide strip and operative to detect position of an article in the web by detecting the position of a protuberance in the web as the protuberance is conveyed between the primary guide strip and the secondary guide strip;

control circuitry communicating with the article detector and a drive motor operative to move the treadle, the control circuitry configured to receive an input signal from the article detector indicative of the position of a web-supported article relative to the punch and the die, and operative to control operation of the drive motor to synchronize movement of the web-supported article via controlled motion of the treadle; and a drive wheel assembly for moving a web and articles, the drive wheel assembly comprising a pair of roller feed assemblies provided on opposed edges of a web, wherein each of the roller feed assemblies comprises a drive release mechanism configured to release the roller feed assemblies from respective edges of the web, the release mechanism carried by the treadle and operative to cooperate with the die as the treadle is moved towards a stationary platen carrying the die.

2. The article handling apparatus of claim 1, wherein the knock lever mechanism comprises a kinematic linkage having a center pivot with the lever arm provided at one end of the kinematic linkage and the follower wheel provided at an opposite end of the kinematic linkage.

3. The article handling apparatus of claim 2, wherein movement of the treadle toward the platen and die imparts contact of the lever arm with the platen that imparts retraction of the follower wheel away from the drive wheel that opens up a gap therebetween and releases a respective edge of a web carried therebetween to enable lateral adjustment of the web and articles when centering the articles during a severing operation.

4. The article handling apparatus of claim 1, wherein the drive release mechanism comprises a knock lever mechanism having a lever arm and a follower wheel, the lever arm configured to contact the die as the treadle is moved towards the stationary platen carrying the follower wheel, and the follower wheel is configured to retract from the respective drive wheel in response to contact of the lever arm with the die.

5. A trim press article handling apparatus, comprising:

a punch and a die carried by a frame, the die cooperating with the punch to sever articles from a web of thermoformable material;

a treadle carried for movement relative to the die, the treadle including a web guide member, a primary guide strip disposed adjacent the web guide member, a secondary guide strip spaced from the guide member, and an article detector to detect a position of an article in the web;

control circuitry communicating with the article detector, and a drive motor operative to move the treadle; and a drive wheel assembly for moving the web and the articles, the drive wheel assembly comprising a pair of roller feed assemblies provided on opposed edges of the web, wherein each of the roller feed assemblies comprises a drive release mechanism carried by the treadle, configured to cooperate with the die as the treadle is moved towards a stationary platen carrying the die, and configured to release the roller feed assemblies from a respective edge of the web in response to cooperation of the drive release mechanism with the die;

wherein the control circuitry is configured to receive an input signal from the article detector, the input signal being indicative of the position of an article relative to the punch and the die, the control circuitry being operative to control operation of the drive motor to synchronize movement of the article via controlled motion of the treadle.

6. The apparatus of claim 5, wherein the article detector is carried by at least one of the primary guide strip and the secondary guide strip and operative to detect a position of an article in the web by detecting a position of a protuberance in the web as the protuberance is conveyed between the primary guide strip and the secondary guide strip.

7. The apparatus of claim 5, wherein the gap between the primary guide strip and the guide member is greater than a thickness of the web of material.

8. The apparatus of claim 5, wherein the second guide strip is spaced at least four thicknesses of the web and spaced apart from the primary guide strip.

9. A trim press article handling apparatus, comprising:

a punch and a die carried by a frame, the die cooperating with the punch to sever articles from a web of thermoformable material;

a treadle configured to move relative to the die, the treadle including a web guide member, a primary guide strip disposed adjacent the web guide member, a secondary guide strip spaced from the guide member, and an article detector to detect a position of an article in the web;

control circuitry communicating with the article detector;

a drive motor conficiured to move the treadle; and a drive wheel assembly for moving a web and articles, the drive wheel assembly comprising a pair of roller feed assemblies provided on opposed edges of the web, wherein each of the roller feed assemblies comprises a drive release mechanism carried by the treadle, configured to cooperate with the die as the treadle is moved towards a stationary platen carrying the die, and configured to release the roller feed assemblies from a respective edge of the web in response to cooperation of the drive release mechanism with the die;

wherein the control circuitry is configured to receive an input signal from the article detector indicative of position of an article relative to the treadle and control operation of the drive motor to move the treadle and the article relative to the punch and the die for synchronized severing of the article from the web.

10. The trim press article handling apparatus of claim 9, further comprising a kinematic linkage coupled between the treadle and a platen that supports the punch, the platen driven for movement by the drive motor and operative to move the treadle with the kinematic linkage and the platen.

11. The trim press article handling apparatus of claim 10, wherein the kinematic linkage comprises a rocker arm for proportionately reciprocating the treadle relative to the platen.

12. The trim press article handling apparatus of claim 9, further comprising a knock lever mechanism is carried by the treadle.

13. The trim press article handling apparatus of claim 9, wherein the drive release mechanism is configured to communicate with the die as the treadle is moved towards the stationary platen carrying the die, and a follower wheel is configured to retract from a respective drive wheel in response to communication of the drive release mechanism with the die to enable the-lateral centering of the web.

* * * * *

UNITED STATES PATENT AND TRADEMARK OFFICE
CERTIFICATE OF CORRECTION

PATENT NO. : 7,415,914 B2  Page 1 of 1
APPLICATION NO. : 10/788849
DATED : August 26, 2008
INVENTOR(S) : Jere F. Irwin It is certified that error appears in the above-identified patent and that said Letters Patent is hereby corrected as shown below:

Title Page, Item (57) in the Abstract, line 9, replace "towards the die. The the follower" with --towards the die. The follower--

Col. 1, line 39, replace "to a die in a step-bystep" with --to a die in a step-by-step--

Col. 2, line 44, replace "moving the web and the articles," with --moving the web and the articles, and--

Col. 2, line 63, replace "The the follower wheel" with --The follower wheel--

Col. 4, line 30, replace "In orderto improve the speed and accuracywith which" with --In order to improve the speed and accuracy with which--

Col. 5, line 34, replace "1 FT5062-1 AC71-4FAO" with --1 FT5062-1 AC71-4FA0--

Col. 5, line 56, replace "buildup of excess sheet there along has" with --buildup of excess sheet therealong has--

Col. 6, line 4, replace "yEasy-Beam Q25 Series" with --y-Easy-Beam Q25 Series--

Col. 8, line 57, replace "three the rods 90" with --three tie rods 90--

Col. 12, line 64, replace "die to enable the-lateral centering" with --die to enable lateral centering--

Signed and Sealed this

Sixteenth Day of December, 2008

JON W. DUDAS
*Director of the United States Patent and Trademark Office*